US011292947B2

(12) United States Patent
Schlingloff et al.

(10) Patent No.: US 11,292,947 B2
(45) Date of Patent: Apr. 5, 2022

(54) POLYURETHANE-BASED BINDER SYSTEM

(71) Applicant: Henkel AG & Co. KGaA, Duesseldorf (DE)

(72) Inventors: Nicole Schlingloff, Duesseldorf (DE); Thomas Engels, Duesseldorf (DE); Kim Verbocket, Moenchengladbach (DE); Thomas Zoeller, Essen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 46 days.

(21) Appl. No.: 16/681,315

(22) Filed: Nov. 12, 2019

(65) Prior Publication Data
US 2020/0079982 A1 Mar. 12, 2020

Related U.S. Application Data

(63) Continuation of application No. PCT/EP2018/061245, filed on May 3, 2018.

(51) Int. Cl.
| | |
|---|---|
| *C09J 175/06* | (2006.01) |
| *B32B 7/12* | (2006.01) |
| *C08G 18/08* | (2006.01) |
| *C08G 18/10* | (2006.01) |
| *C08G 18/24* | (2006.01) |
| *C08G 18/32* | (2006.01) |
| *C08G 18/36* | (2006.01) |
| *C08G 18/40* | (2006.01) |
| *C08G 18/44* | (2006.01) |
| *C08G 18/62* | (2006.01) |
| *C08G 18/66* | (2006.01) |
| *C08G 18/76* | (2006.01) |

(52) U.S. Cl.
CPC .............. *C09J 175/06* (2013.01); *B32B 7/12* (2013.01); *C08G 18/0885* (2013.01); *C08G 18/10* (2013.01); *C08G 18/246* (2013.01); *C08G 18/3206* (2013.01); *C08G 18/36* (2013.01); *C08G 18/4063* (2013.01); *C08G 18/44* (2013.01); *C08G 18/6208* (2013.01); *C08G 18/664* (2013.01); *C08G 18/6662* (2013.01); *C08G 18/7671* (2013.01)

(58) Field of Classification Search
CPC .... C09J 175/06; C08G 18/44; C08G 18/4063; C08G 18/4202
See application file for complete search history.

(56) References Cited

U.S. PATENT DOCUMENTS

| | | | |
|---|---|---|---|
| 4,602,079 A | 7/1986 | Vinches et al. | |
| 4,769,420 A * | 9/1988 | Schwerzel | C09D 5/4488 525/113 |
| 5,883,217 A | 3/1999 | Werenicz et al. | |
| 8,697,188 B2 | 4/2014 | Wang et al. | |
| 8,865,842 B2 | 10/2014 | Krebs et al. | |
| 9,051,499 B2 | 6/2015 | Mahdi et al. | |
| 9,096,782 B2 | 8/2015 | Takahira et al. | |
| 9,453,152 B2 | 9/2016 | Carlson et al. | |
| 9,914,862 B2 | 3/2018 | Kelch et al. | |
| 2004/0170767 A1 | 9/2004 | Flosbach et al. | |
| 2006/0105187 A1* | 5/2006 | Simons, Jr. | B32B 37/12 428/483 |
| 2009/0214875 A1* | 8/2009 | Paschkowski | C08G 18/12 428/423.1 |
| 2012/0208015 A1* | 8/2012 | Takahira | C09J 167/00 428/355 N |
| 2014/0242396 A1* | 8/2014 | Kanagawa | C08G 18/6229 428/423.1 |
| 2017/0058163 A1* | 3/2017 | Slark | C08G 18/4202 |
| 2021/0292621 A1 | 9/2021 | Demmig et al. | |

FOREIGN PATENT DOCUMENTS

| | | |
|---|---|---|
| CA | 1237849 A | 6/1988 |
| CN | 103180356 A | 6/2013 |
| CN | 103261252 A | 8/2013 |
| CN | 103502296 A | 1/2014 |
| CN | 105121492 A | 12/2015 |
| CN | 112334506 A | 2/2021 |
| EP | 2144944 B1 | 6/2018 |
| GB | 2203425 A | 10/1988 |
| JP | H11241056 A | 9/1999 |
| JP | 2004244443 A | 9/2004 |
| JP | 2005500415 A | 1/2005 |
| JP | 2010037463 A | 2/2010 |
| RU | 2014112501 A | 10/2015 |
| WO | 2016204978 A1 | 12/2016 |

OTHER PUBLICATIONS

International Search Report for International PCT Patent Application No. PCT/EP2018/061245 dated Jul. 6, 2018.

* cited by examiner

*Primary Examiner* — Michael M Dollinger
(74) *Attorney, Agent, or Firm* — James E. Piotrowski

(57) ABSTRACT

A binder system, containing a special polyol mixture as a resin component, said polyol mixture containing at least one polyester based on a fatty acid dimer, a fatty acid trimer or the alcohols derived therefrom, and at least one polyisocyanates as a resin component and/or a NCO-terminated polyurethane prepolymer. The binder system can be used as an adhesive/sealing material, in particular as an adhesive for gluing various substrates.

17 Claims, No Drawings

POLYURETHANE-BASED BINDER SYSTEM

The present invention relates to a binder system that contains, as a resin component, a specific polyol mixture containing at least one polyester based on a fatty acid dimer, trimer or the alcohols derived therefrom and, as a curing component, at least one polyisocyanate and/or an NCO-terminated polyurethane prepolymer, and to the use of the binder system as an adhesive/sealant, in particular as an adhesive for adhesively bonding different substrates.

Two-component binder systems, in particular based on polyols and NCO-terminated compounds, have long been state of the art. They are used for example in the metal-working industry, the automotive industry, the electrical industry, the packaging industry or the construction industry as adhesives, sealants, fillers or casting compounds.

In many industries, such as the automotive industry, the proportion of lightweight products manufactured, for example to meet emissions targets, continues to increase. As a result of using many different materials in these fields, the challenge is to effectively adhesively bond various materials of this type together. For this purpose, adhesives are required which, in addition to high strength (tensile strength), also provide high elongation in order to take into account the different properties of the substrates. There is therefore a need for adhesives which, in addition to high strength, also provide high flexibility and therefore allow various substrates to be efficiently adhesively bonded at room temperature or an increased temperature.

The problem addressed by the present invention was to provide a binder system which meets these specifications and provides both high tensile strengths and high flexibility.

The inventors have surprisingly found that this problem can be solved by a binder system which uses a specific polyol mixture as a resin component and a polyisocyanate as a curing agent.

In a first aspect, the invention therefore relates to a binder system containing
  (i) a resin component containing
    (a) at least 10 wt. %, based on the total weight of the resin component, of a polyester polyol that is based on a fatty acid dimer or trimer or the diols or triols derived therefrom and has a weight-average molecular weight (Mw) of at least 1,000 g/mol, preferably from 1,000 to 4,000 g/mol;
    (b) at least 10 wt %, based on the total weight of the resin component, of a polyester polyol that is different from (a) and has a weight-average molecular weight (Mw) of at least 1,000 g/mol, preferably from 1,000 to 4,000 g/mol;
    (c) optionally an aliphatic OH-terminated polymer that is different from (a) and (b) and has a weight-average molecular weight (Mw) of at least 1,000 g/mol, preferably from 1,000 to 20,000 g/mol; and
    (d) optionally a monomeric chain extender having at least 2 NCO-reactive groups;
  (ii) a curing component containing at least one polyisocyanate, preferably an aromatic diisocyanate, and/or at least one NCO-terminated polyurethane prepolymer.

A further aspect of the invention relates to the use of the binder system described herein in adhesive formulations, in particular as a two-component adhesive, for producing adhesive bonds between substrates, the substrates being in particular different substrates, for example selected from wood, plastics or metal.

In a further aspect, the invention relates to methods for preparing an adhesive/sealant using the binder system described herein. In this case the resin component is mixed with the curing component in a (molar) ratio of the isocyanate groups to hydroxyl groups of 5:1 to 1:1.

(a) In yet another aspect, the invention also relates to polymer compositions which can be obtained by reacting a resin component containing at least 10 wt. %, based on the total weight of the resin component, of a polyester polyol that is based on a fatty acid dimer or trimer or the diols or triols derived therefrom and has a weight-average molecular weight (Mw) of at least 1,000 g/mol, preferably from 1,000 to 4,000 g/mol;
  (b) at least 10 wt. %, based on the total weight of the resin component, of a polyester polyol that is different from (a) and has a weight-average molecular weight (Mw) of at least 1,000 g/mol, preferably from 1,000 to 4,000 g/mol;
  (c) optionally an aliphatic OH-terminated polymer that is different from (a) and (b) and has a weight-average molecular weight (Mw) of at least 1,000 g/mol, preferably from 1,000 to 20,000 g/mol; and
  (d) optionally a monomeric chain extender having at least 2 NCO-reactive groups;
with a curing component containing at least one polyisocyanate, preferably an aromatic diisocyanate.

The molecular weights specified in the present text refer to the weight-average molecular weight (Mw), unless otherwise specified. All molecular weights mentioned are values obtainable by gel permeation chromatography (GPC), unless otherwise indicated.

"At least one," as used herein, means 1 or more, i.e. 1, 2, 3, 4, 5, 6, 7, 8, 9 or more. In relation to an ingredient, the expression refers to the type of ingredient and not to the absolute number of molecules. "At least one polyol" therefore means, for example, at least one type of polyol, i.e., that one type of polyol or a mixture of a plurality of different polyols can be used. Together with weight data, the expression refers to all compounds of the indicated type that are contained in the composition/mixture, that is to say that the composition does not contain any other compounds of this type beyond the indicated amount of the corresponding compounds.

Unless explicitly indicated otherwise, all percentages that are cited in connection with the compositions described herein refer to wt. %, in each case based on the relevant mixture.

"Approximately" or "ca." as used herein in connection with a numerical value relates to the numerical value±10%, preferably ±5%.

The resin component of the binder system according to the invention comprises at least 10 wt. %, based on the total weight of the resin component, of a polyester polyol (a) that is based on a fatty acid dimer or trimer or the diols or triols derived therefrom and has a weight average molecular weight (Mw) of at least 1,000 g/mol, preferably from 1,000 to 4,000 g/mol. This polyester polyol (a) is preferably a diol or triol, particularly preferably a diol.

The term "fatty acid dimer or trimer" as used herein relates to the dimerized product of the reaction of two or more mono- or polyunsaturated fatty acids. Fatty acid dimers of this kind are well known in the prior art and typically exist as mixtures. They often contain a proportion of trimeric and monomeric fatty acids, the latter being relatively low. Proportions of from 0 to 20 mol. % of fatty acid trimer are common. Fatty acid dimers of this kind and polyesters derived therefrom are described for example in GB 2203425 A. The diols or triols derived therefrom can be obtained by reducing the carboxyl groups to hydroxyl groups. Dimers of C18 fatty acids, i.e. fatty acid dimers having 36 C atoms, are particularly preferred. These can be obtained for example by dimerizing oleic acid, linoleic acid and linolenic acid and mixtures thereof.

The polyester polyols (a) can be obtained by reacting (polycondensing) the fatty acid dimers or trimers described above with polyols, in particular diols, in particular aliphatic C2-6 diols (as described below in the context of polyester (b)) or polyether diols (as described below), and further polycarboxylic acids, in particular dicarboxylic acids, in particular aliphatic or aromatic C4-12 dicarboxylic acids (as described below in the context of polyester (b)). In this case the additional dicarboxylic acids can be used in a molar ratio to the fatty acid dimers of from 1:9 to 9:1, preferably 1:8 to 8:1, more preferably 1:1 to 8:1.

Alternatively, the alcohols derived from the fatty acid dimers/trimers can also be reacted with the aforementioned dicarboxylic acids and also with the diols.

The polyester polyols (a) thus obtained preferably have a weight-average molecular weight (Mw) in the range of from 1,000 to 4,000 g/mol, in particular from 1,500 to 3,000 g/mol.

Suitable polyester polyols (a) based on C36 fatty acid dimers are available, for example, under the trade name Priplast® (Croda International PLC), in particular as Priplast® 1838 LQ.

The polyester polyols (a) are contained in the resin component in amounts of at least 10 wt. % up to 90 wt. %, preferably up to 70 wt. %, more preferably up to 50 wt. %, in each case based on the total weight of the resin component. The lower limit is preferably 15 wt. %, more preferably 20 wt. %, even more preferably 25 wt. %. Typical use amounts are from 15 to 45 wt. %.

Suitable polyester polyols (b) can be prepared by polycondensation. Difunctional and/or trifunctional alcohols having a deficit of dicarboxylic acids or tricarboxylic acids or mixtures of dicarboxylic acids or tricarboxylic acids, or reactive derivatives thereof, may thus be condensed to form polyester polyols. Polyester polyols (b) comprise, for example, the reaction products of polyfunctional, preferably difunctional alcohols (optionally together with small quantities of trifunctional alcohols) and polyfunctional, preferably difunctional carboxylic acids. Instead of free polycarboxylic acids, the corresponding polycarboxylic acid anhydrides or corresponding polycarboxylic acid esters with alcohols having preferably 1 to 3 C atoms can also be used (where possible). The polycarboxylic acids can be aliphatic, cycloaliphatic, aromatic or heterocyclic, or both. They may optionally be substituted, for example by alkyl groups, alkenyl groups, ether groups or halogens. Suitable polycarboxylic acids are, for example, succinic acid, adipic acid, suberic acid, azelaic acid, sebacic acid, dodecanedioic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, or mixtures of two or more thereof. Suitable tricarboxylic acids are for example citric acid or trimellitic acid. The aforementioned acids can be used individually or as mixtures of two or more thereof. In general, C4-12 dicarboxylic acids, i.e. dicarboxylic acids having 4 to 12 C atoms, and in this case in particular phthalic acid, isophthalic acid, terephthalic acid, adipic acid, dodecanedioic acid and mixtures thereof, are particularly suitable.

Particularly suitable alcohols are hexanediol, butanediol, ethylene glycol, diethylene glycol, neopentyl glycol, propylene glycol, glycerol or trimethylolpropane or mixtures of two or more thereof. 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol and polybutylene glycol are also suitable as polyfunctional alcohols for preparing polyester polyols. In general, C2-6 diols, i.e. diols having 2 to 6 C atoms, are preferred.

Polyesters that can be obtained from lactones, for example based on 6-caprolactone, also referred to as "polycaprolactone", or hydroxycarboxylic acids, for example w-hydroxycaproic acid, in particular those which can be obtained by reacting low-molecular-weight alcohols, in particular of ethylene glycol, diethylene glycol, neopentyl glycol, hexanediol, butanediol, or trimethylolpropane with caprolactone, can also be used as the polyester polyols (b).

However, polyester polyols of oleochemical origin can also be used as polyester polyol (b). Polyester polyols of this kind can be prepared, for example, by complete ring opening of epoxidized triglycerides of a fat mixture which contains an at least partially olefinically unsaturated fatty acid and has one or more alcohols having 1 to 12 C atoms and subsequent partial transesterification of the triglyceride derivatives to form alkyl ester polyols having 1 to 12 C atoms in the alkyl group.

Polycarbonate polyols are very particularly preferably used as the polyester polyols (b). These can be obtained, for example, by reacting diols, such as propylene glycol, 1,4-butanediol or 1,6-hexanediol, 1,8-octanediol, 1,12-dodecanediol, diethylene glycol, triethylene glycol or tetraethylene glycol or mixtures of these diols, in particular 1,6-hexanediol and 1,12-dodecanediol being preferred, with dialkyl carbonates, diaryl carbonates, for example diphenyl carbonates, or phosgene. The term "polyester polyol" as used herein therefore includes polycarbonate polyols.

However, the polyester polyol (b) does not contain the fatty acid dimers or trimers or the alcohols derived therefrom that form the basis of the polyester (a) as an acid or alcohol constituent. It is therefore excluded according to the invention that the polyester polyol (b) falls under the definition of the polyester polyol (a) and vice versa.

The polyester polyols (b) preferably have a weight-average molecular weight (Mw) in the range of from 1,000 to 4,000 g/mol, in particular from 1,500 to 3,000 g/mol.

The polyester polyols (b) are contained in the resin component in amounts of at least 10 wt. % up to 90 wt. %, preferably up to 60 wt. %, more preferably up to 40 wt. %, in each case based on the total weight of the resin component. The lower limit is preferably 15 wt. %. Typical use amounts are approximately from 15 to 40 wt. %.

The resin component can contain further polyols beyond the stated polyesters (a) and (b). Particularly noteworthy here are aliphatic OH-terminated polymers (c).

These can be, for example, polyether polyols, but preferably olefinic polymers or synthetic rubbers having hydroxyl end groups.

Polyether polyols may be produced from a plurality of alcohols which contain one or more primary or secondary alcohol groups. As an initiator for the preparation of polyethers that do not contain any tertiary amino groups, the following compounds or mixtures of said compounds can be used by way of example: water, ethylene glycol, propylene glycol, glycerol, butanediol, butanetriol, trimethylolethane, pentaerythritol, hexanediol, 3-hydroxyphenol, hexanetriol, trimethylolpropane, octanediol, neopentyl glycol, 1,4-hydroxymethylcyclohexane, bis(4-hydroxyphenyl)dimethylmethane and sorbitol. Ethylene glycol, propylene glycol, glycerol and trimethylolpropane are preferably used, particularly preferably ethylene glycol and propylene glycol, and, in a particularly preferred embodiment, propylene glycol is used.

Alkylene oxides such as ethylene oxide, propylene oxide, butylene oxide, epichlorohydrin, styrene oxide or tetrahydrofuran or mixtures of these alkylene oxides may be used as cyclic ethers for preparing the above-described polyethers. Propylene oxide, ethylene oxide or tetrahydrofuran or mixtures thereof are preferably used. Propylene oxide or ethylene oxide or mixtures thereof are particularly preferably used. Propylene oxide is most particularly preferably used.

OH-terminated polyolefins or synthetic rubbers are in particular those based on polybutadiene, polyisoprene, polybutylene or polypropylene, in particular (hydrogenated) polybutadiene. The latter are available, for example, under the trade name Krasol® from Cray Valley, with Krasol® HLBH P-2000 and P-3000 being particularly preferred in this case.

The aliphatic OH-terminated polymers (c) preferably have a weight-average molecular weight (Mw) in the range of from 1,000 to 4,000 g/mol, in particular from 2,000 to 3,500 g/mol.

The aliphatic OH-terminated polymers (c) are optionally contained in the resin component in amounts of up to 40 wt. %, preferably up to 30 wt. %, more preferably up to 25 wt. %, in each case based on the total weight of the resin component. The lower limit is preferably 5 wt. %. Typical use amounts are approximately from 5 to 20 wt. %.

The aliphatic OH-terminated polymers (c) do not comprise any polyesters, i.e. it is excluded according to the invention that the polyester polyols (a) and (b) fall under the definition of polymer (c) and vice versa.

Finally, the resin component can also contain a chain extender (d) having at least two NCO-reactive groups. Monomeric diols, in particular monomeric aliphatic diols, are particularly preferred in this case. Examples of suitable compounds are C2 to 020 diols, in particular C6 to C12 diols, such as 1,9-nonanediol.

The chain extenders are contained in the resin component in amounts of up to 20 wt. %, preferably up to 15 wt. %, very particularly preferably from 5 to 12 wt. %.

The curing component contains at least one polyisocyanate and/or at least one NCO-terminated polyurethane prepolymer.

Suitable polyisocyanates are aliphatic, aromatic and/or alicyclic isocyanates having two or more, preferably two to at most approximately four, isocyanate groups. Monomeric polyisocyanates, in particular monomeric diisocyanates, are particularly preferably used in the context of the present invention. Examples of suitable monomeric polyisocyanates are: 1,5-naphthylene diisocyanate, 2,2'-, 2,4- and/or 4,4'-diphenylmethane diisocyanate (MDI), hydrogenated MDI (H12MDI), allophanates of the MDI, xylylene diisocyanate (XDI), tetramethylxylylene diisocyanate (TMXDI), 4,4'-diphenyl dimethylmethane diisocyanate, di- and tetraalkylene diphenylmethane diisocyanate, 4,4'-dibenzyl diisocyanate, 1,3-phenylene diisocyanate, 1,4-phenylene diisocyanate, the isomers of toluene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanato phenyl perfluoroethane, tetramethoxybutane-1,4-diisocyanate, butane-1,4-diisocyanate, hexane-1,6-diisocyanate (HDI), dicyclohexylmethane diisocyanate, cyclohexane-1,4-diisocyanate, ethylene diisocyanate, phthalic acid-bis-isocyanato-ethyl ester, also diisocyanates having reactive halogen atoms, such as 1-chloromethylphenyl-2,4-diisocyanate, 1-bromomethylphenyl-2,6-diisocyanate,3,3-bis-chloromethylether-4,4'-diphenyl diisocyanate or sulfur-containing polyisocyanates.

Sulfur-containing polyisocyanates can be obtained for example by reacting 2 mol hexamethylene diisocyanate with 1 mol thiodiglycol or dihydroxydihexyl sulfide.

Further diisocyanates which can be used are for example trimethylhexamethylene diisocyanate, 1,4-diisocyanatobutane, 1,12-diisocyanatododecane and dimer fatty acid diisocyanate. The following are particularly suitable: tetramethylene, hexamethylene, undecane, dodecamethylene, 2,2,4-trimethylhexane, 2,3,3-trimethylhexamethylene, 1,3-cyclohexane, 1,4-cyclohexane, 1,3- or 1,4-tetramethylxylene, isophorone, 4,4-dicyclohexylmethane and lysine ester diisocyanate.

Suitable at least trifunctional isocyanates are polyisocyanates which are obtained by trimerization or oligomerization of diisocyanates or by reacting diisocyanates with polyfunctional compounds containing hydroxyl or amino groups. The diisocyanates already mentioned above are isocyanates suitable for preparing trimers, the trimerization products of the isocyanates HDI, MDI, TDI or IPDI being particularly preferred.

Furthermore, adducts of diisocyanates and low-molecular-weight triols are suitable as triisocyanates, in particular the adducts of aromatic diisocyanates and triols such as trimethylolpropane or glycerol. The polymeric isocyanates, as occur for example as a residue in the distillation bottom when distilling diisocyanates, are also suitable for use. Polymeric MDI, as can be obtained from the distillation residue when distilling MDI, is particularly suitable in this case.

The polyisocyanates used are in particular aromatic polyisocyanates, particularly preferably aromatic diisocyanates. In a preferred embodiment of the invention, monomeric polyisocyanates from the group 1,5-naphthylene diisocyanate, 2,2'-, 2,4- and/or 4,4'-diphenylmethane diisocyanate (MDI), the isomers of toluene diisocyanate (TDI), tetramethylxylylene diisocyanate (TMXDI), trimerization products of the isocyanates MDI or TDI, and mixtures thereof, are therefore used as the polyisocyanates. Methylene diphenyl diisocyanates (MDI), such as 4,4-methylene diphenyl diisocyanate, 2,4-methylene diphenyl diisocyanate or 2,2-methylene diphenyl diisocyanate or mixtures thereof, are particularly preferred.

The isocyanate (NCO)-terminated PU prepolymers, which can be contained in the curing component instead of or in addition to the polyisocyanates, are obtained by reacting a polyol or a polyol mixture with a stoichiometric excess of polyisocyanate. The polyols used when preparing the prepolymer can be all polyols that are usually used for polyurethane synthesis, for example monomeric polyols, polyester polyols including polycarbonate polyols, polyether polyols, polyester ether polyols, or mixtures of two or more thereof.

The polyether polyols, polyester polyols, polycarbonate polyols, and monomeric polyols can be the compounds that have already been described above in the context of the constituents of the resin component.

The molecular weight of the polyols used for synthesizing the prepolymer is preferably in the range of up to 20,000 g/mol, in particular up to 10,000 g/mol. The nominal functionality may be 2, 3 or 4, preferably 2 or 3. The average functionality is therefore preferably in the range of from 2 to 4, from 2 to 3 or from 2 to 2.5.

In various embodiments of the invention, polyester polyols, in particular those which can be obtained by condensation of adipic acid and/or isophthalic acid with diethylene glycol and/or 1,2-propylene glycol, are used, optionally in combination with 1,2-propylene glycol, as polyols for preparing the NCO-terminated prepolymers.

Polyisocyanates suitable for preparing the prepolymers are those already described above.

The at least one NCO-terminated PU prepolymer is preferably an aromatic isocyanate-terminated, more preferably MDI-terminated polyurethane prepolymer consisting of one or more polyether polyol(s), in particular polyethylene glycol, polypropylene glycol and copolymers thereof, and an aromatic diisocyanate, such as MDI.

NCO-terminated prepolymers having a polyether polymer backbone, in particular those from a polyether polyol of ethylene oxide and propylene oxide, are preferred according to the invention.

The stoichiometric excess of polyisocyanate during synthesis of the prepolymers may, based on the molar ratio of NCO to OH groups, be 2 to 25, preferably 4 to 10 or 11 to 25. High excesses of this kind are then used in particular when the resulting prepolymer is used together with the unreacted polyisocyanate as a curing agent. In these cases, the curing agent is a mixture of NCO-terminated prepolymer and monomeric polyisocyanates.

The corresponding prepolymers usually have an NCO content of from 5 to 30 wt. %, preferably from 9 to 19, more preferably from 13 to 18, most preferably from 12 to 17 wt. %, and have a nominal average NCO functionality of from 2 to 3, preferably 2 to 2.7, more preferably 2 to 2.4, most preferably 2 to 2.2.

On account of the excess of isocyanate used, the NCO-terminated PU prepolymers, as mentioned above, usually contain certain amounts of isocyanate monomers, i.e. in particular aromatic polyisocyanate monomers, for example MDI. The amount may in this case usually be from 10 to 40 wt. %, in particular from 20 to 30 wt. %, based on the total NCO content.

The weight-average molecular weight (Mw) of the prepolymer is usually in the range of from 1,500 g/mol to 100,000 g/mol, particularly preferably from 2,000 g/mol to 50,000 g/mol.

The preparation of the NCO-terminated prepolymers is known per se to a person skilled in the art and takes place for example such that the polyols that are liquid at reaction temperatures are mixed with an excess of the polyisocyanates, and the resulting mixture is stirred until a constant NCO value is obtained. Temperatures in the range of from 40° C. to 180° C., preferably from 50° C. to 140° C., are selected as the reaction temperature.

The curing component preferably contains up to 100 wt. % of the polyisocyanates, typically from 90 to 100 wt. %, based on the curing component. Aromatic diisocyanates such as MDI are very particularly preferred in this case. In various embodiments, however, the curing agent may also contain a combination of at least one polyisocyanate, preferably an aromatic diisocyanate, such as MDI, with at least one NCO-terminated prepolymer. In embodiments of this kind, the prepolymer may constitute up to 90 wt. % of the curing agent, preferably up to 80 wt. %, it being possible for the remainder to be the at least one polyisocyanate which is used in amounts of at least 10, preferably at least 20 wt. %.

In various embodiments, the binder system described herein may also contain at least one catalyst, in particular selected from metal catalysts based on Sn or Ti or amine catalysts. Suitable catalysts are known in the prior art. In preferred embodiments, the binder system contains a tin-based catalyst, particularly an organotin catalyst such as DBTL (dibutyltin dilaurate).

The binder system described herein is particularly suitable as an adhesive/sealant.

The present invention therefore also relates to a method for preparing an adhesive/sealant using the binder system described herein, the resin component being mixed with the curing component in suitable volume ratios, typically 10:1 to 1:1, in particular 5:1 to 1:1, particularly preferably 2:1 and 1:1. In this case, the molar ratio of the isocyanate groups to NCO-reactive (in particular OH) groups is from 10:1 to 1:1, preferably 7:1 to 1:1, particularly preferably 5:1 to 1:1, more preferably 3:1 to 1:1, and in particular 2:1 to 1:1. The NCO index is preferably from 0.9 to 2.0, in particular 1.0 to 1.5.

In various embodiments, the adhesive/sealant thus obtained, after mixing the two components and incubating for 7 days under normal conditions (23° C., 50% relative air humidity, 1013 mbar), has a tensile strength of >7 MPa, typically 7 to 25 MPa, and an elongation of >80 to 600%.

In one embodiment of the method described herein, the reaction between the resin component and curing component takes place in the presence of a solvent. In principle, all solvents known to a person skilled in the art can be used as the solvent, in particular esters, ketones, halogenated hydrocarbons, alkanes, alkenes and aromatic hydrocarbons. Examples of solvents of this kind are methylene chloride, trichloroethylene, toluene, xylene, butyl acetate, amyl acetate, isobutyl acetate, methyl isobutyl ketone, methoxybutyl acetate, cyclohexane, cyclohexanone, dichlorobenzene, diethyl ketone, di-isobutyl ketone, dioxane, ethyl acetate, ethylene glycol monobutyl ether acetate, ethylene glycol monoethyl acetate, 2-ethylhexyl acetate, glycol diacetate, heptane, hexane, isobutyl acetate, isooctane, isopropyl acetate, methyl ethyl ketone, tetrahydrofuran, or tetrachloroethylene, or mixtures of two or more of the stated solvents. In preferred embodiments, however, no solvent is used.

The binder system described herein is suitable as a two-component adhesive for adhesively bonding and sealing the different substrates. These substrates include, for example, wood, metal, glass, plant fibers, stone, paper, cellulose hydrate, plastics such as ABS, polystyrene, polyethylene, polypropylene, polyethylene terephthalate, polyvinyl chloride, copolymers of vinyl chloride and vinylidene chloride, copolymers of vinyl acetate olefins, polyamides and carbon fiber-reinforced plastics. Aluminum, steel and iron are relevant metals, for example.

In a particularly preferred embodiment of the invention, the binder system described herein is used as a solvent-free adhesive.

The binder system described herein can be applied to the substrates to be adhesively bonded using all commonly used application methods, for example by bead dosing, spraying, doctoring, ¾-roller coating assemblies in the case of using a solvent-free binder system or 2-roller coating assemblies in the case of using a solvent-containing binder system.

The binder system described herein can contain conventional additives such as plasticizers, drying agents, fillers, silanes, antioxidants, UV stabilizers, and anti-ageing agents, and combinations thereof. These can be added both to the resin component and to the curing component.

Plasticizers that can preferably be used are phthalic acid esters, for example dioctyl phthalate, ditridecyl phthalate and butyl benzyl phthalate, phosphoric acid esters, for example tricresyl phosphate, adipates, for example dioctyl adipate, or benzoates, for example propylene glycol dibenzoate.

Amino, epoxy or mercapto silanes, in particular gamma-glycidyloxypropyl or gamma-aminopropyltrimethoxy silanes, are used primarily for improving the adhesion to glass, metals, etc.

Inorganic fillers such as carbon black, calcium carbonate, titanium dioxide and the like can also be added to the binder system described herein. Highly dispersed silicic acids, above all fumed silicas or precipitated silicas, which act in a thixotropic manner and of which the thixotropic properties remain in the binder systems described herein even after prolonged storage, are preferably used as further inorganic fillers. For example, zeolites can be used as the drying agent.

The binder systems described herein can be used in adhesive formulations for producing adhesive bonds between substrates. In this case, the substrates can be selected from those already mentioned above.

In a further aspect, the invention also relates to polymer compositions which can be obtained by reacting a resin component as described herein with a curing component as described herein which contains at least one polyisocyanate, preferably an aromatic diisocyanate. In various embodiments, an excess of curing agent based on the molar ratio of NCO to NCO-reactive (OH) groups is used. NCO-terminated prepolymers can be obtained in this way. These can then be used as curing agents, either alone or in combination with (monomeric) polyisocyanates, in the binder systems described herein, the resin component remaining unchanged. Alternatively however, these NCO-terminated prepolymers thus obtained, which contain the polyester polyols (a) based on a fatty acid dimer or trimer or the diols or triols derived therefrom in the backbone, can also be used in combination with polyol-based resin components known in the prior art. Use as a resin in combination with a curing agent which contains the compounds having NCO-reactive groups, such as polyols or polyamines, is also conceivable. Embodiments of this kind are known to a person skilled in the art. It is intended that binder systems of this kind will also be covered by the invention.

It shall be readily understood that all embodiments disclosed herein in connection with the binder system can also be used for the described uses and methods, and the polymer compositions and binder systems which contain these, and vice versa. The invention shall be described in further detail below with reference to an example. Unless stated otherwise, the amounts specified are in wt. %.

EXAMPLES

Example 1

TABLE 1

| Resin component | | | | |
|---|---|---|---|---|
| | Mw (g/mol) | OH functionalit | OH number | Amount (wt. %) |
| Priplast 1838 LQ (C36 fatty acid dimer-based polyester) | 2,000 | 2 | 56 | 41.46 |
| Krasol HLBH P-3000 (OH-terminated hydrogenated polybutadiene) | 3,100 | 1.9 | 31 | 21.00 |
| Desmophen C1200 (polycarbonate | 1,000 | 1.7 | 56 | 20.46 |

TABLE 1-continued

| Resin component | | | | |
|---|---|---|---|---|
| | Mw (g/mol) | OH functionalit | OH number | Amount (wt. %) |
| Nonanediol-1,9 | 160 | 2 | 700 | 10.05 |
| DBTL (tin catalyst) | | | | 0.03 |
| Sylosiv A3 (zeolite) | | | | 5.00 |
| Aerosil R202 (fumed silica) | | | | 2.00 |

A mixture of 2,4-/4,4-MDI (Desmodur CD; 94 wt. %) and Aerosil R202 (6 wt. %) having an NCO content of 27.8% was used as the curing component.

The resin component and curing component were mixed (resin: 66.93 wt. %; curing agent: 33.07 wt. %) and the mechanical properties of the obtained adhesive compound were examined. The results are shown in Table 2.

TABLE 2

| Mechanical properties | |
|---|---|
| E modulus (MPa) | 26 |
| Tensile strength (MPa) | 8.8 |
| Elongation at break (%) | 250 |

The mechanical properties were determined by means of DIN EN ISO 527. The results show that the obtained adhesive bonds have very good mechanical properties.

The invention claimed is:

1. A binder system including:
   (i) a resin component comprising,
      (a) at least 10 wt. %, based on the total weight of the resin component, of a polyester polyol that is based on a fatty acid dimer, a fatty acid trimer, a diol derived from a fatty acid dimer or fatty acid trimer or a triol derived from a fatty acid dimer or fatty acid trimer and has a weight-average molecular weight (Mw) of at least 1,000 g/mol;
      (b) at least 10 wt. %, based on the total weight of the resin component, of a polyester polyol that is different from (a) and has a weight-average molecular weight (Mw) of at least 1,000 g/mol;
      (c) at least one OH-terminated polyolefin that is different from (a) and (b) and has a weight-average molecular weight (Mw) of at least 1,000 g/mol; and
      (d) optionally at least 2 wt. % of a monomeric chain extender having at least 2 NCO-reactive groups;
   (ii) a curing component comprising at least one of a polyisocyanate, an aromatic diisocyanate and an NCO-terminated polyurethane prepolymer.

2. The binder system according to claim 1, wherein the polyester polyol (a) is the reaction product of fatty acid dimers and diols and optionally dicarboxylic acids which are different from the dimer fatty acids.

3. The binder system according to claim 1, wherein the fatty acid dimer is obtained by dimerizing two C18 fatty acids and the polyester polyol (a) is the reaction product of the fatty acid dimer and C2-C6 diols and optionally C4-C12 dicarboxylic acids.

4. The binder system according to claim 1, wherein the resin component comprises 25 wt. % to 50 wt. % of the polyester polyol (a), based on the total weight of the resin component.

5. The binder system according to claim 1, wherein the polyester polyol (b) is a polycarbonate polyol.

6. The binder system according to claim 1, wherein the polyester polyol (b) is a polycarbonate polyol having hexanediol and/or dodecanediol as a diol component.

7. The binder system according to claim 1, wherein the resin component comprises 15 wt. % to 40 wt. % polyester polyol (b), based on the total weight of the resin component.

8. The binder system according to claim 1, wherein the (c) OH-terminated polyolefin:
   (1) is an OH-terminated polybutadiene or an OH-terminated hydrogenated polybutadiene; and
   (2) is contained in the resin component in an amount in the range of 5 wt. % to 30 wt. %.

9. The binder system according to claim 1, wherein the chain extender (d):
   (1) is a monomeric aliphatic diol;
   (2) is a monomeric aliphatic C6-C12 diol;
   (3) is 1,9-nonanediol; and/or
   (4) is contained in the resin component in amounts of up to 20 wt. %.

10. The binder system according to claim 1, wherein the curing component
    (1) comprises at least one aromatic diisocyanate, in an amount of from 90 to 100 wt. %, based on the curing component; or
    (2) comprises at least 10 wt. % of the aromatic diisocyanate and up to 90 wt. % of the NCO-terminated prepolymer.

11. A two part adhesive comprising the binder system of claim 1, wherein the adhesive has a first part including the resin component and a second part including the curing component.

12. An article comprising a first substrate having a surface, a second substrate having a surface adjacent the first substrate surface and a mixture of the resin component of claim 1 and the curing component of claim 1 disposed between and in contact with the surfaces.

13. The article of claim 12 wherein the first substrate is comprised of wood, plastic or metal and the second substrate is independently comprised of wood, plastic or metal.

14. Cured reaction products of a mixture of the resin component of claim 1 and the curing component of claim 1.

15. The binder system according to claim 1, wherein the (c) OH-terminated polyolefin is an OH-terminated polybutadiene.

16. A binder system consisting of a (i) resin component and a (ii) curing component, wherein:
   (i) the resin component comprises,
      (a) at least 10 wt. %, based on the total weight of the resin component, of a polyester polyol that is based on a fatty acid dimer, a fatty acid trimer, a diol derived from a fatty acid dimer or fatty acid trimer or a triol derived from a fatty acid dimer or fatty acid trimer and has a weight-average molecular weight (Mw) of at least 1,000 g/mol;
      (b) at least 10 wt. %, based on the total weight of the resin component, of a polyester polyol that is different from (a) and has a weight-average molecular weight (Mw) of at least 1,000 g/mol;
      (c) optionally at least one aliphatic OH-terminated polymer that is different from (a) and (b) and has a weight-average molecular weight (Mw) of at least 1,000 g/mol; and
      (d) optionally at least 2 wt. % of a monomeric chain extender having at least 2 NCO-reactive groups;
   (ii) the curing component comprises at least one of a polyisocyanate, an aromatic diisocyanate or both, wherein the curing component is free of an NCO-terminated polyurethane prepolymer.

17. The binder system according to claim 1, wherein the (c) aliphatic OH-terminated polymer:
   (1) is contained in the resin component in an amount in the range of 5 wt. % to 30 wt. %; and
   (2) is an OH-terminated polybutadiene or an OH-terminated hydrogenated polybutadiene.

* * * * *

UNITED STATES PATENT AND TRADEMARK OFFICE
CERTIFICATE OF CORRECTION

PATENT NO. : 11,292,947 B2
APPLICATION NO. : 16/681315
DATED : April 5, 2022
INVENTOR(S) : Nicole Schlingloff et al.

It is certified that error appears in the above-identified patent and that said Letters Patent is hereby corrected as shown below:

In the Specification

Column 4, Line 10 change from "6-caprolactone" to --ε-caprolactone--.

Column 5, Line 39 change from "C2 to 020 diols" to --C2 to C20 diols--.

Signed and Sealed this
Twenty-first Day of February, 2023

Katherine Kelly Vidal
*Director of the United States Patent and Trademark Office*